United States Patent
Hano

(10) Patent No.: US 8,773,060 B2
(45) Date of Patent: Jul. 8, 2014

(54) BRUSHLESS MOTOR DRIVE DEVICE AND DRIVE METHOD

(75) Inventor: Masaki Hano, Isesaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 53 days.

(21) Appl. No.: 13/445,335

(22) Filed: Apr. 12, 2012

(65) Prior Publication Data

US 2012/0306416 A1  Dec. 6, 2012

(30) Foreign Application Priority Data

May 31, 2011  (JP) .................... 2011-122490

(51) Int. Cl.
  *G05B 11/28*  (2006.01)
(52) U.S. Cl.
  USPC ............... 318/599; 318/400.26; 318/400.13
(58) Field of Classification Search
  USPC .............. 318/400.32, 400.26, 400.1, 599
  See application file for complete search history.

(56) References Cited

U.S. PATENT DOCUMENTS

| 8,436,564 B2* | 5/2013 | Kern et al. ............ 318/400.32 |
| 2002/0140395 A1* | 10/2002 | Tazawa et al. ............ 318/727 |
| 2007/0145919 A1* | 6/2007 | Hamaoka et al. ............ 318/254 |
| 2008/0048598 A1* | 2/2008 | Shibuya ............ 318/400.1 |
| 2010/0164581 A1* | 7/2010 | Zhang et al. ............ 327/175 |

FOREIGN PATENT DOCUMENTS

| JP | 11-032498 A | 2/1999 |
| JP | 11-069867 A | 3/1999 |
| JP | 2005-057990 A | 3/2005 |
| JP | 2009-189176 A | 8/2009 |
| JP | 2010-017044 A | 1/2010 |

* cited by examiner

*Primary Examiner* — Eduardo Colon Santana
*Assistant Examiner* — Bickey Dhakal
(74) *Attorney, Agent, or Firm* — Foley & Lardner LLP

(57) ABSTRACT

The invention relates to a brushless motor drive device that performs switching determination of energization modes of a three-phase brushless motor according to a sensorless method, and a drive method thereof. A pulse induced voltage induced in a non-energized phase of three phases by a pulse voltage is compared with a threshold to determine the switching timing of the energization modes. Here, by limiting a duty ratio of a voltage application to equal to or greater than a lower limit, a situation in which the pulse induced voltage is sampled while the pulse induced voltage is oscillating is avoided, and a situation in which the pulse induced voltage falls below a voltage detection resolution is avoided. As a result, determination of energization mode switching timing based on a pulse induced voltage can be performed more stably.

12 Claims, 17 Drawing Sheets

BRUSHLESS MOTOR DRIVE DEVICE AND DRIVE METHOD

BACKGROUND OF THE INVENTION

1. Field of the Invention

The present invention relates to a brushless motor drive device that performs switching determination of energization modes of a three-phase brushless motor according to a sensorless method, and a drive method thereof.

2. Description of Related Art

Japanese Laid-open Patent Publication No. 2009-189176 discloses a drive system of a synchronous electric motor that detects a pulse induced voltage of a non-energized phase induced by a pulse voltage, in a three-phase synchronous electric motor, and compares the pulse induced voltage with a reference voltage to sequentially switch the energization modes according to the comparison result.

The pulse induced voltage of the non-energized phase is detected while a pulse voltage is applied to two phases. However, immediately after start of voltage application, the pulse induced voltage oscillates. Therefore, if a duty ratio of the pulse voltage is small, the level of the pulse induced voltage is detected in a state with the pulse induced voltage oscillating, and hence, energization mode switching timing may be erroneously determined.

Moreover, a magnitude of the pulse induced voltage in the non-energized phase changes according to the duty ratio of the pulse voltage. Consequently, if the duty ratio is small, the voltage falls below a voltage detection resolution, and hence, determination of the energization mode switching timing may not be performed.

SUMMARY OF THE INVENTION

It is therefore an object of an aspect of the present invention to provide a brushless motor drive device that can perform determination of energization mode switching timing based on a pulse induced voltage, more stably, and a drive method thereof.

In order to achieve the above objects, a brushless motor drive device according to an aspect of the present invention includes: a switching section that has a plurality of energization modes in which two phases to be applied with a pulse voltage are selected from three phases of a three-phase brushless motor, and switches the plurality of energization modes; a determining section that determines switching timing of the energization modes based on a pulse induced voltage induced in a non-energized phase of the three phases by the pulse voltage; and a restricting section that sets a duty ratio of the pulse voltage to equal to or greater than a lower limit.

Moreover, a brushless motor drive method according to an aspect of the present invention includes the steps of: determining switching timing of energization modes based on a pulse induced voltage induced in a non-energized phase of three phases of a three-phase brushless motor; switching a plurality of energization modes in which two phases to be applied with a pulse voltage are selected from the three phases of the three-phase brushless motor, at the switching timing of the energization modes; and setting a duty ratio of the pulse voltage to equal to or greater than a lower limit, and applying the pulse voltage to two phases corresponding to the energization modes.

Other objects and features of an aspect of the present invention will be understood from the following description with reference to the accompanying drawings.

DESCRIPTION OF THE PREFERRED EMBODIMENTS

Figure 1:
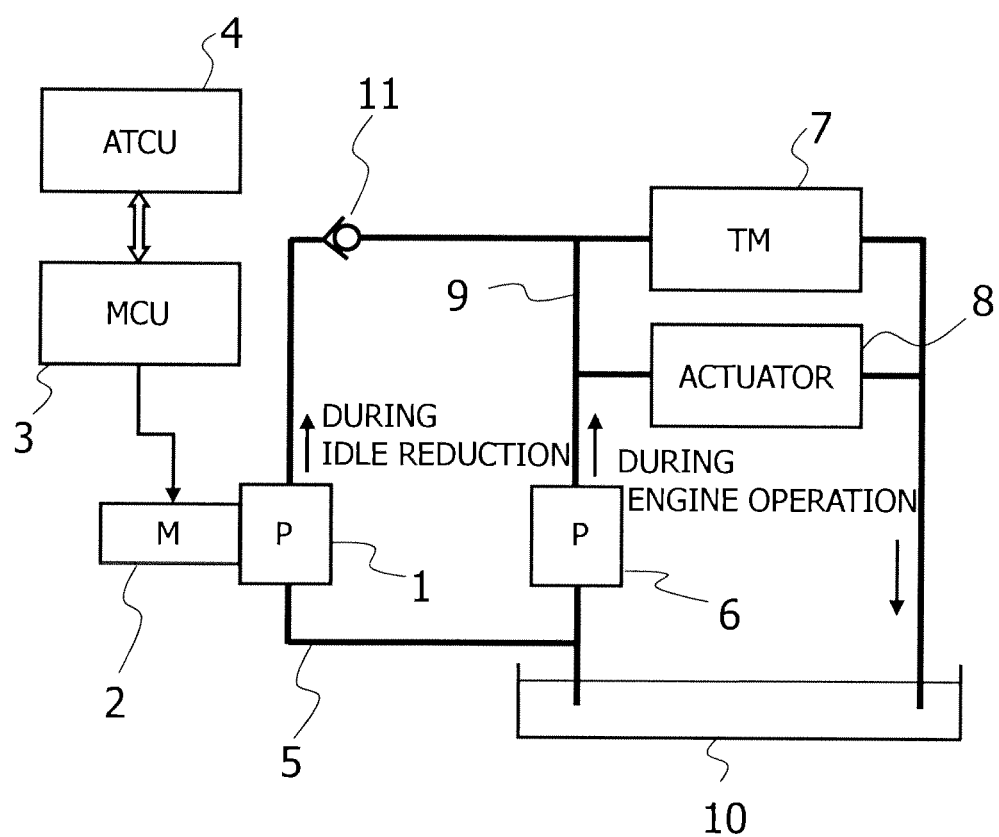
FIG. 1 is a block diagram showing a hydraulic system in an embodiment of the present invention.

FIG. 1 is a block diagram showing a configuration of a hydraulic system for an automatic transmission of a vehicle.

The hydraulic system shown in FIG. 1 includes a mechanical oil pump 6 driven by an output of an engine (not shown), and a motor-driven electric oil pump 1, serving as oil pumps that supply oil to a transmission 7 and an actuator 8.

Furthermore, the hydraulic system includes an idle reduction function for stopping an engine when an automatic stop condition is established, and restarting the engine when an automatic startup condition is established. While the engine is stopped by the idle reduction function, the operation of mechanical oil pump 6 is also stopped. Consequently, during the idle reduction, electric oil pump 1 is operated to supply oil to transmission 7 and the actuator 8, thereby suppressing a decrease in oil pressure.

Electric oil pump 1 is driven by a brushless motor 2 directly connected thereto. Brushless motor 2 is controlled by a motor control unit 3 based on a command from an AT control unit 4.

Motor control unit 3 is a drive device that drives brushless motor 2.

Electric oil pump 1 supplies oil in an oil pan 10 to transmission 7 and actuator 8 via an oil pipe 5.

During operation of the engine, oil in the oil pan 10 is supplied to the transmission 7 and the actuator 8 via an oil pipe 9 by mechanical oil pump 6. At that time, brushless motor 2 is stopped and a check valve 11 blocks off the flow of oil toward electric oil pump 1.

When the engine is stopped by idle reduction, the engine speed decreases, thereby decreasing the rotational speed of mechanical oil pump 6 and decreasing the oil pressure in oil pipe 9. AT control unit 4 transmits a motor startup command to motor control unit 3 in synchronization with engine shutdown by idle reduction.

Upon reception of a startup command, motor control unit 3 starts up brushless motor 2 to rotate electric oil pump 1, thereby starting pressure feed of oil by electric oil pump 1.

While discharge pressure of mechanical oil pump 6 decreases, when the discharge pressure of electric oil pump 1 exceeds a set pressure, check valve 11 opens. Consequently, oil circulates through a route of oil pipe 5, electric oil pump 1, check valve 11, transmission 7, actuator 8, and oil pan 10.

Equipment driven by brushless motor 2 is not limited to the oil pump. The equipment driven by brushless motor 2 can be, for example, an electric water pump used for circulating engine coolant in a hybrid vehicle.

Figure 2:
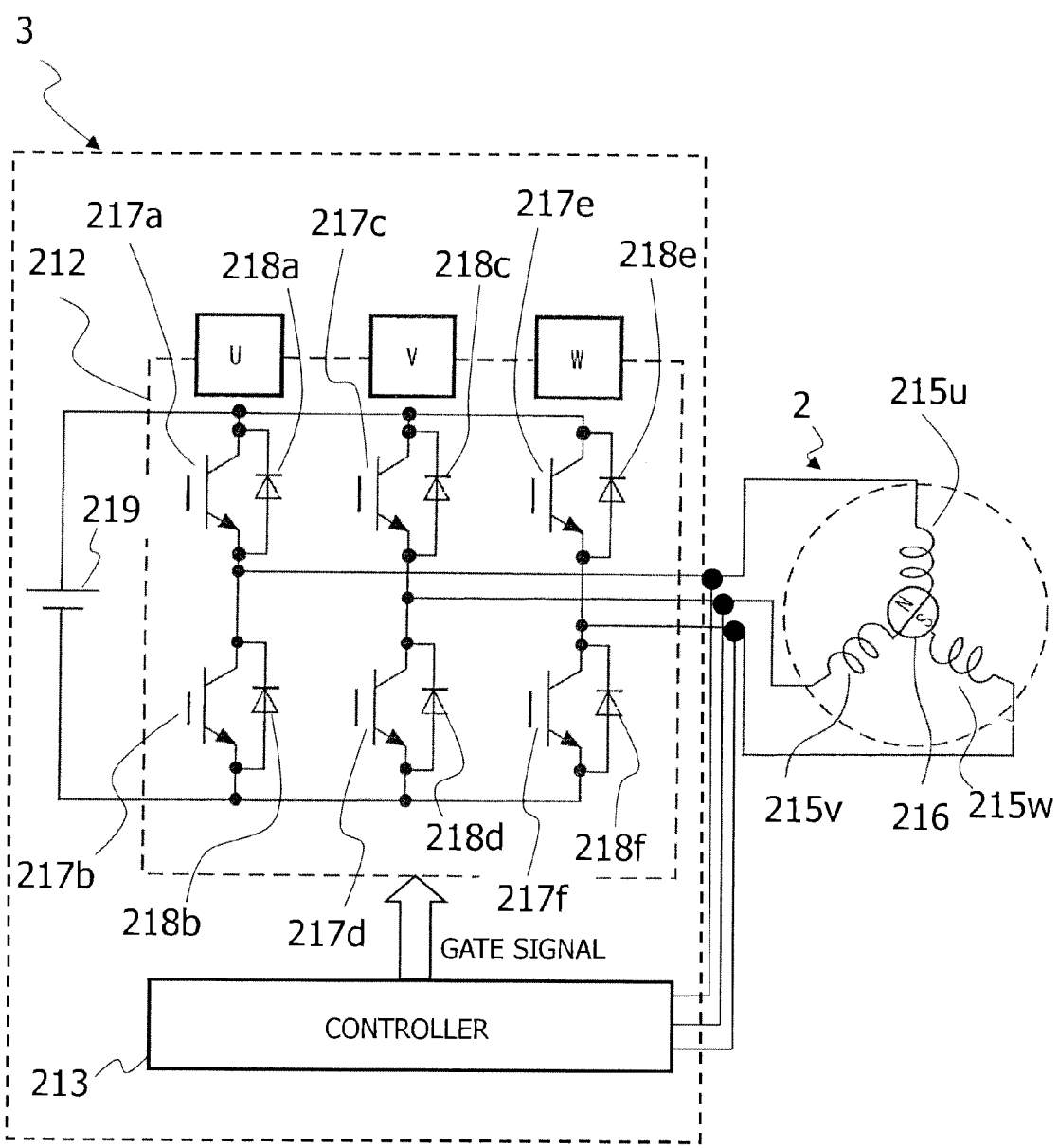
FIG. 2 is a circuit diagram showing a motor control unit and a brushless motor in the embodiment of the present invention.

FIG. 2 shows the configuration of motor control unit 3 and brushless motor 2.

Motor control unit 3 includes a motor drive circuit 212 and a controller 213 including a microcomputer. Controller 213 communicates with AT control unit 4.

Brushless motor 2 is a three-phase DC brushless motor including three-phase windings 215u, 215v, and 215w of a U-phase, a V-phase, and a W-phase in a cylindrical stator (not shown), and a permanent magnet rotor 216 that is rotatable in a space formed at the center of the stator.

Motor drive circuit 212 includes a circuit including three-phase bridge-connected switching devices 217a to 217f including antiparallel diodes 218a to 218f, and a power supply circuit 219. Switching devices 217a to 217f are formed of, for example, an FET.

Control terminals of switching devices 217a to 217f are connected to controller 213, and ON and OFF of switching devices 217a to 217f is controlled by pulse width modulation by controller 213.

Figure 3:
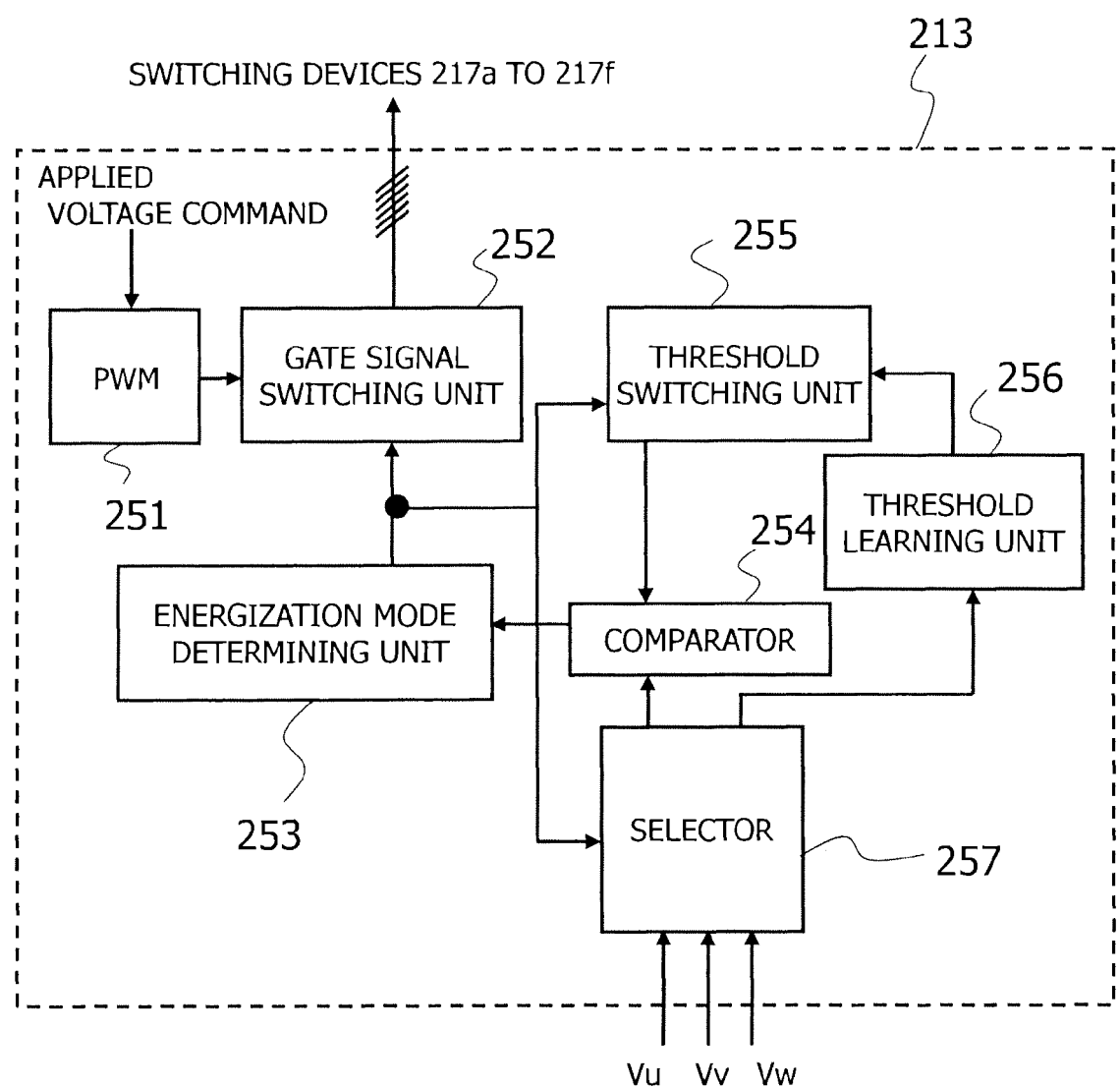
FIG. 3 is a block diagram showing a controller in the embodiment of the present invention.

Controller 213 calculates a voltage applied to brushless motor 2 and generates a pulse width modulation signal (PWM signal) to be output to drive circuit 212. As shown in FIG. 3, controller 213 includes a PWM generator 251, a gate signal switching unit 252, an energization mode determining unit 253, a comparator 254, a threshold switching unit 255, a threshold learning unit 256, and a selector 257.

PWM generator 251 is a circuit for generating a PWM wave based on a command value of applied voltage.

Energization mode determining unit 253 is a device that sequentially outputs a mode command signal for determining the energization mode of motor drive circuit 212, and switches the energization mode to six different modes based on a signal output by comparator 254.

The energization mode indicates a two-phase selection pattern to apply the pulse voltage, of three phases.

Gate signal switching unit 252 determines the operation of the respective switching devices 217a to 217f in motor drive circuit 212 based on an output of energization mode determining unit 253, and outputs six gate pulse signals to motor drive circuit 212 according to the determination.

Threshold switching unit 255 is a circuit that generates a threshold in switching control of the energization mode based on a comparison between a pulse induced voltage in a non-energized phase and the threshold. Switching timing of the threshold is determined based on a mode command signal, which is an output of energization mode determining unit 253.

Selector 257 selects a voltage value of a non-energized phase of three-phase terminal voltages Vu, Vv, and Vw of brushless motor 2 according to the mode command signal, and outputs the selected voltage value to comparator 254 and threshold learning unit 256.

Strictly speaking, the terminal voltage of the non-energized phase is a voltage between the ground and a terminal. However, in the present embodiment, a voltage at a neutral point is detected, and a difference between the voltage at the neutral point and the voltage between the ground and the terminal is designated as terminal voltages Vu, Vv, and Vw.

Comparator 254 compares the threshold output by threshold switching unit 255 with a voltage value of the non-energized phase output by selector 257 to determine the energization mode switching timing, and orders energization mode determining unit 253 to switch the energization modes.

The voltage of the non-energized phase is a pulse induced voltage induced in a non-energized phase by application of the pulse voltage to two phases.

Moreover, because the saturated state of the magnetic circuit changes according to the position of the rotor, a pulse induced voltage corresponding to the position of the rotor is generated in a non-energized phase. Consequently, the position of the rotor is estimated based on the pulse induced voltage in the non-energized phase, and the energization mode switching timing can be detected based on the estimated position of the rotor.

Moreover, threshold learning unit 256 is a device that updates and stores a threshold used for determination of the energization mode switching timing.

The pulse induced voltage in the non-energized phase detected for determining the switching timing, fluctuates due to the production tolerance of brushless motor 2 or the detection tolerance of the voltage detection circuit. Consequently, when a fixed value is used as a threshold with respect to the tolerance of the pulse induced voltage, the energization mode switching timing may be erroneously determined.

Therefore, threshold learning unit 256 detects the pulse induced voltage at a position of a magnetic pole corresponding to the energization mode switching timing, updates the threshold based on the detection result, and rewrites the threshold stored by threshold switching unit 255 based on the updated threshold.

Figure 4:
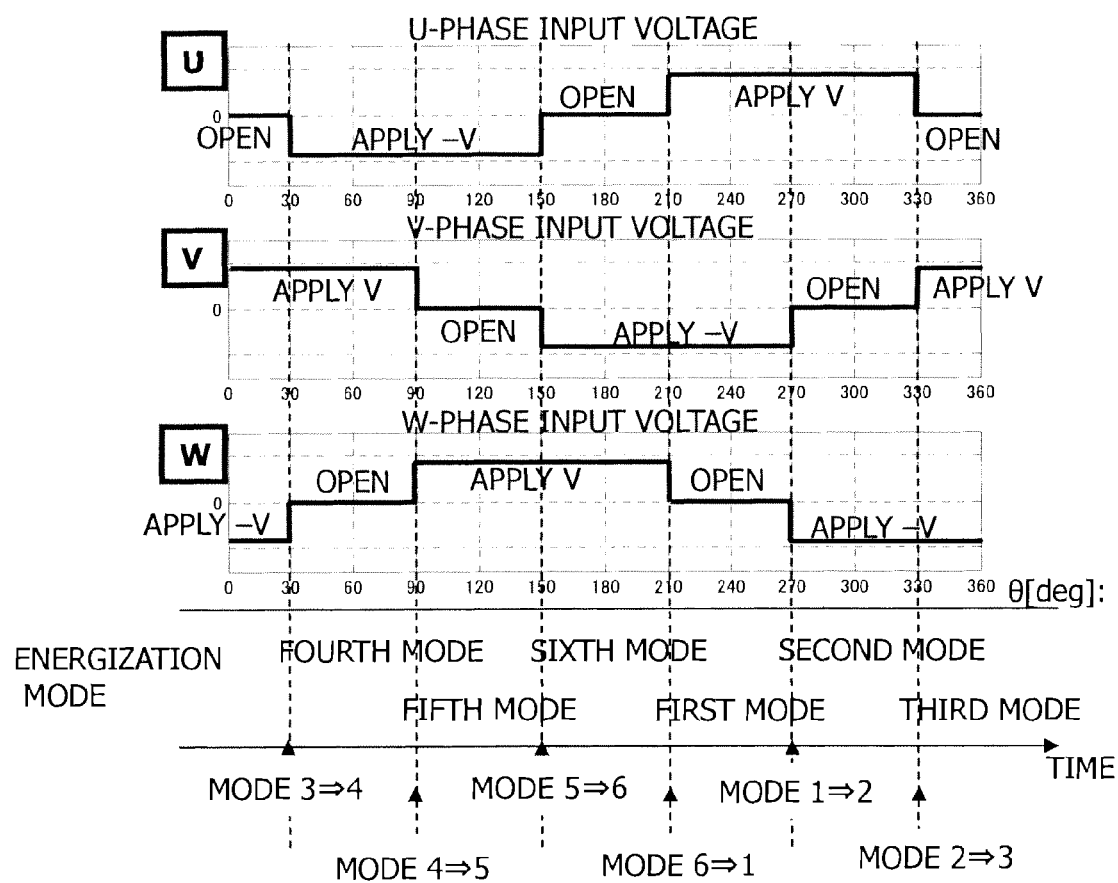
FIG. 4 is a timing chart showing an energization pattern of the brushless motor in the embodiment of the present invention.

FIG. 4 shows a voltage applied state to the respective phases in each energization mode.

The energization mode includes six different energization modes, which are sequentially switched over for each electric angle of 60 degrees. In each of the six different energization modes, pulse voltage is applied to two phases selected from three phases.

In the present embodiment, a state in which the rotor is positioned at an angular position of a U-phase coil is designated as a position at which an angular position of the rotor is 0 degrees. An angular position of the rotor that switches over from a third energization mode to a fourth energization mode is set to 30 degrees, an angular position of the rotor that switches from the fourth energization mode to a fifth energization mode is set to 90 degrees, an angular position of the rotor that switches from the fifth energization mode to a sixth energization mode is set to 150 degrees, an angular position of the rotor that switches from the sixth energization mode to a first energization mode is set to 210 degrees, an angular position of the rotor that switches from the first energization mode to a second energization mode is set to 270 degrees, and an angular position of the rotor that switches from the second energization mode to the third energization mode is set to 330 degrees.

In the first energization mode, switching devices 217a and 217d are on-controlled, and all other switching devices are turned off, thereby applying voltage V to the U-phase and voltage −V to the V-phase, so that electric current flows from the U-phase to the V-phase.

In the second energization mode, switching devices 217a and 217f are on-controlled, and all other switching devices are turned off, thereby applying voltage V to the U-phase and voltage −V to the W-phase, so that electric current flows from the U-phase to the W-phase.

In the third energization mode, switching devices 217c and 217f are on-controlled, and all other switching devices are turned off, thereby applying voltage V to the V-phase and voltage −V to the W-phase, so that electric current flows from the V-phase to the W-phase.

In the fourth energization mode, switching devices 217b and 217c are on-controlled, and all other switching devices are turned off, thereby applying voltage V to the V-phase and voltage −V to the U-phase, so that electric current flows from the V-phase to the U-phase.

In the fifth energization mode, switching devices 217b and 217e are on-controlled, and all other switching devices are turned off, thereby applying voltage V to the W-phase and voltage −V to the U-phase, so that electric current flows from the W-phase to the U-phase.

In the sixth energization mode, switching devices 217e and 217d are on-controlled, and all other switching devices are turned off, thereby applying voltage V to the W-phase and voltage −V to the V-phase, so that electric current flows from the W-phase to the V-phase.

In the case of the energization control described above, for example, in the first energization mode, switching devices 217a and 217d are turned on, and all other switching devices are turned off, thereby applying voltage V to the U-phase and voltage −V to the V-phase, so that electric current flows from the U-phase to the V-phase. Instead of such energization control, energization in the respective energization modes can be performed according to a complementary control method in which switching device 217c in an upper stage is driven by a PWM wave in an opposite phase to a PWM wave that drives switching device 217d in a lower stage, so that when switching device 217d in the lower stage is turned on, switching device 217c in the upper stage is turned off, and when switching device 217d in the lower stage is turned off, switching device 217c in the upper stage is turned on.

As described above, the six energization modes are switched over for each electric angle of 60 degrees, thereby energizing the respective switching devices 217a to 217f for 120 degrees for every 240 degrees, and thus, the energization method shown in FIG. 4 is referred to as 120-degree energization method.

Figure 5:
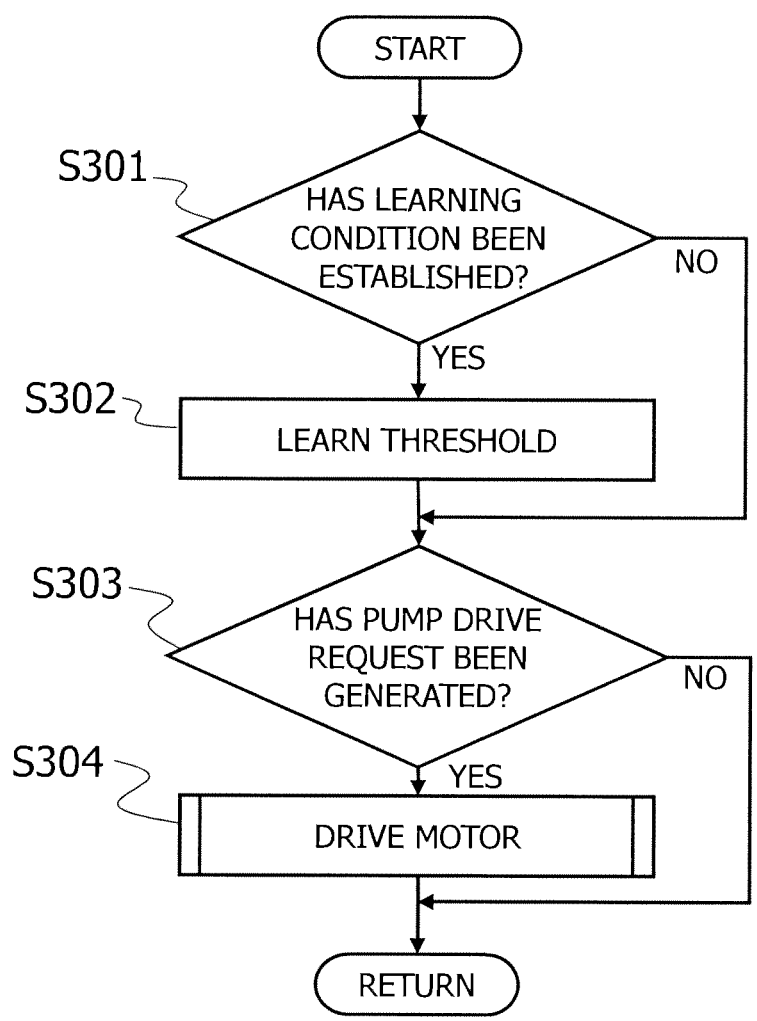
FIG. 5 is a flowchart showing a main routine of drive control of the brushless motor in the embodiment of the present invention.

The flowchart in FIG. 5 shows an outline of drive control of brushless motor 2 by motor control unit 3.

In Step S301, motor control unit 3 determines whether a threshold learning condition used for determination of the energization mode switching timing, in other words, an operation condition of threshold learning unit 256, is established.

Specifically, the threshold learning condition is such that a drive request of brushless motor 2 has not been issued immediately after power on or immediately after shutdown of electric oil pump 1.

If the learning condition is established, control proceeds to Step S302 as a threshold learning process to learn a threshold.

An example of the threshold learning process is shown below.

For example, at the time of learning a threshold V to be used for switching determination from the fourth energization mode to the fifth energization mode, rotor 216 is first positioned at an angle corresponding to the third energization mode.

After a voltage corresponding to the third energization mode is applied, that is, Vu=0, Vv=Vin, and Vw=−Vin are applied to the respective phases, torque is generated because permanent magnet rotor 216 is attracted to a synthetic flux of the U-phase, the V-phase, and the W-phase, and a north pole of permanent magnet rotor 216 rotates up to an angle of 90 degrees.

It is presumed that positioning of the rotor at an angle of 90 degrees is complete, after application of the voltage corresponding to the third energization mode and waiting for the passage of time required for rotor 216 to rotate up to the angle of 90 degrees.

The angle of 90 degrees at which rotor 216 is attracted when phase energization corresponding to the third energization mode is performed, is an angular position at which switching from the fourth energization mode to the fifth energization mode is performed.

When positioning of rotor 216 at the angle of 90 degrees is complete, a voltage application pattern corresponding to the third energization mode is switched over to a voltage application pattern corresponding to the fourth energization mode, that is, Vu=−Vin, Vv=Vin, and Vw=0.

A terminal voltage Vw of the W-phase, which is a non-energized phase in the fourth energization mode, immediately after switching from an applied voltage corresponding to the third energization mode to an applied voltage corresponding to the fourth energization mode, is detected, and a threshold V4-5 used for switching determination from the fourth energization mode to the fifth energization mode is updated based on the terminal voltage Vw and stored.

That is to say, switching from the fourth energization mode to the fifth energization mode is set to be performed at the angle of 90 degrees, as described above, and it is determined whether the rotor has rotated to the angle of 90 degrees, in other words, whether it is the switching timing from the fourth energization mode to the fifth energization mode, based on the terminal voltage Vw of the W-phase, which is a non-energized phase in the fourth energization mode.

Rotor 216 can be positioned at the angular position, at which switching from the fourth energization mode to the fifth energization mode is performed, by sustaining applied voltage corresponding to the third energization mode. When switching from the third energization mode to the fourth energization mode is performed in this state, the terminal voltage Vw of the W-phase immediately after switching to the fourth energization mode indicates a terminal voltage V of a non-energized phase at an angular position of 90 degrees.

The threshold V4-5 used for switching determination from the fourth energization mode to the fifth energization mode is updated based on the terminal voltage Vw of the W-phase immediately after switching from the state in which the applied voltage corresponding to the third energization mode is sustained, to the fourth energization mode, and is then stored.

When the terminal voltage Vw of the W-phase, which is the non-energized phase of the fourth energization mode, crosses the threshold V4-5, switching from the fourth energization mode to the fifth energization mode is executed.

A threshold used for switching of other energization modes can be learnt in the same manner.

In learning of the threshold, the terminal voltage V of a non-energized phase at the angular position for switching the energization modes can be stored directly as the threshold. Moreover, a weighted average between the previous thresholds and the terminal voltage V of a non-energized phase acquired this time can be set as a new threshold. Furthermore, a moving average of the terminal voltage V of a non-energized phase acquired for several times in the past can be stored as a new voltage threshold.

Moreover, if the terminal voltage V of the non-energized phase acquired this time has a value within a normal range stored beforehand, the threshold is updated based on the terminal voltage V of the non-energized phase acquired this time. If the terminal voltage V is outside of the normal range, update of the threshold based on the terminal voltage V of the non-energized phase acquired this time is restricted and the threshold can be left as it is and held.

Furthermore, in an unlearnt state in which a design value is stored as an initial value of the threshold, and learning of the threshold has never been experienced, the energization mode switching timing can be determined by using the initial value as the threshold.

Moreover at the time of switching from the first energization mode to the second energization mode, at the time of switching from the third energization mode to the fourth energization mode, and at the time of switching from the fifth energization mode to the sixth energization mode, because the voltage of a non-energized phase oscillates toward a negative side with respect to a reference voltage, a common threshold can be set with respect to switching of these modes.

On the other hand, at the time of switching from the second energization mode to the third energization mode, at the time of switching from the fourth energization mode to the fifth energization mode, and at the time of switching from the sixth energization mode to the first energization mode, because the voltage of a non-energized phase oscillates toward a positive side with respect to the reference voltage, a common threshold can be set with respect to switching of these modes.

Furthermore, for example, the threshold V4-5 learnt as described above is set as the common threshold at the time of switching from the second energization mode to the third energization mode, at the time of switching from the fourth energization mode to the fifth energization mode, and at the time of switching from the sixth energization mode to the first energization mode. On the other hand, at the time of switching from the first energization mode to the second energization mode, at the time of switching from the third energization mode to the fourth energization mode, and at the time of switching from the fifth energization mode to the sixth energization mode, a threshold having an absolute value the same as that of the threshold V4-5 can be used as a common threshold.

However, the threshold learning process is not limited to the one described above, and well-known various learning processes can be appropriately adopted.

When the threshold to be used for determination of the mode switching timing is learnt in Step S302, and when it is determined that the learning condition has not been established in Step S301, control proceeds to Step S303.

In Step S303, it is determined whether a drive request of electric oil pump 1 is generated. In the present embodiment, an idle reduction request indicates the drive request of electric oil pump 1.

Here, if a drive request of electric oil pump 1 is generated, control proceeds to Step S304, in which sensorless motor control is performed to determine the switching timing to the next energization mode by comparing the voltage of a non-energized phase in the energization mode at that time with the threshold.

Regarding startup of brushless motor 2, for example, after rotor 216 is positioned at the position of 90 degrees by a voltage application corresponding to the third energization mode, the energization mode is switched to the fifth energization mode to start rotation of brushless motor 2. Then, motor control unit 3 determines that rotor 216 is at the position of 150 degrees, which is the angular position for switching from the fifth energization mode to the sixth energization mode, based on the voltage of the V-phase, which is a non-energized phase in the fifth energization mode, to perform switching to the sixth energization mode. Thereafter, the energization modes are sequentially switched by comparing the voltage of a non-energized phase with the threshold.

On the other hand, when a drive request of electric oil pump 1 is not generated, the routine is finished by bypassing Step S304.

Details of the motor control in Step S304 will be explained with reference to the flowchart in FIG. 6.

In Step S351, a target number of revolutions (rpm) of brushless motor 2 is calculated.

Figure 7:
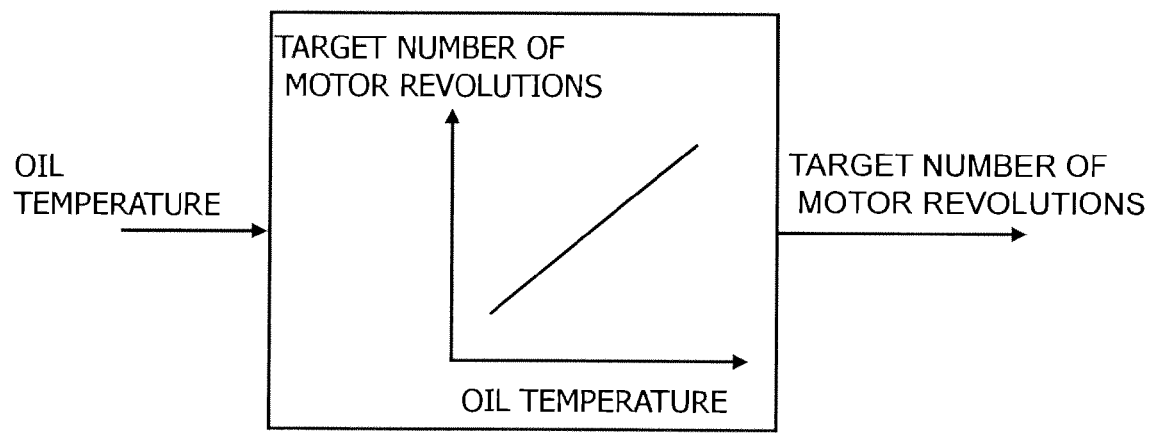
FIG. 7 is a diagram showing a characteristic of a target number of motor revolutions in the embodiment of the present invention.

In brushless motor 2 that rotates electric oil pump 1 of the present embodiment, for example, as shown in FIG. 7, as the oil temperature becomes higher, the target number of revolutions is set to higher revolutions.

On the other hand, when brushless motor 2 drives a water pump that circulates coolant to the engine, the target number of revolutions can be set to higher revolutions, as the coolant temperature becomes higher.

In Step S352, a command value of the applied voltage is calculated based on the target number of revolutions calculated in Step S351 and an actual number of motor revolutions (rpm).

For example, the command value of the applied voltage is determined according to the following equation by proportional-integral control based on a deviation between the target number of revolutions and the actual number of revolutions.

Applied voltage=deviation×proportional gain+integral value of deviation×integral gain Deviation=target number of revolutions−actual number of revolutions However, the method of determining the command value of the applied voltage is not limited to the method based on a target number of motor revolutions. For example, well-known determination methods such as a method of determining a command value of the applied voltage based on a deviation between a target discharge pressure and an actual discharge pressure of electric oil pump 1, and a method of determining a command value of the applied voltage based on a requested torque can be appropriately adopted. Moreover, a calculation process of the applied voltage for approximating the actual value to the target value is not limited to the proportional-integral control, and a well-known calculation method such as a proportional-integral-derivative control can be appropriately adopted.

In Step S353, a lower limit DMIN of a duty ratio of the voltage application is determined. The lower limit DMIN is a lower limit of the duty ratio when phase energization is PWM controlled. A determination method of the lower limit DMIN will be explained later in detail.

In Step S354, the duty ratio of the voltage application is determined based on the applied voltage determined in Step S352 and the lower limit DMIN determined in Step S353.

At first, a basic duty ratio (%) is calculated as basic duty= (applied voltage)/(power-supply voltage)×100.

When the basic duty ratio (%) is larger than the lower limit DMIN, the basic duty ratio is directly designated as a final duty ratio. On the other hand, when the basic duty ratio (%) is lower than the lower limit DMIN, the lower limit DMIN is designated as the final duty ratio, thereby limiting the duty ratio so as not to fall below the lower limit DMIN.

Here, when the basic duty ratio is lower than the lower limit DMIN and the lower limit DMIN is designated as the duty ratio of the voltage application, the actual applied voltage becomes higher than the requested applied voltage based on the deviation between the target number of revolutions and the actual number of revolutions.

However, as described later, when brushless motor 2 is controlled with the duty ratio lower than the lower limit DMIN, the energization mode switching timing may be erroneously determined in the sensorless control, thereby causing loss of synchronism. Accordingly, when there is a drive request of brushless motor 2, control of loss of synchronism should be given priority to satisfying the request of the applied voltage based on the deviation of the number of revolutions. Consequently, the duty ratio is limited so as not to fall below the lower limit DMIN.

When the basic duty ratio (%) is lower than the lower limit DMIN and the lower limit DMIN is designated as the duty ratio, integral values of the deviation in the proportional-integral control are accumulated, and hence, a measure such as stopping update of the integral value of the deviation can be taken.

Moreover, in the hydraulic oil pump system as in the present embodiment, it is not requested to control the number of motor revolutions highly accurately, and an oil discharge rate more than the requested rate can be ensured by applying applied voltage higher than the request, thereby enabling to suppress a decrease in oil pressure or a lack of lubrication. Furthermore, when brushless motor 2 drives a water pump, a circulation amount of the coolant at least more than a requested amount can be ensured and overheat of the engine can be suppressed.

In Step S355, the voltage of a non-energized phase in the energization mode at that time is detected.

Specifically, the voltage of the W-phase is detected in the first energization mode, the voltage of the V-phase is detected in the second energization mode, the voltage of the U-phase is detected in the third energization mode, the voltage of the W-phase is detected in the fourth energization mode, the voltage of the V-phase is detected in the fifth energization mode, and the voltage of the U-phase is detected in the sixth energization mode. Selector 257 selects a non-energized phase based on the signal from the energization mode determining unit 253.

Figure 8:
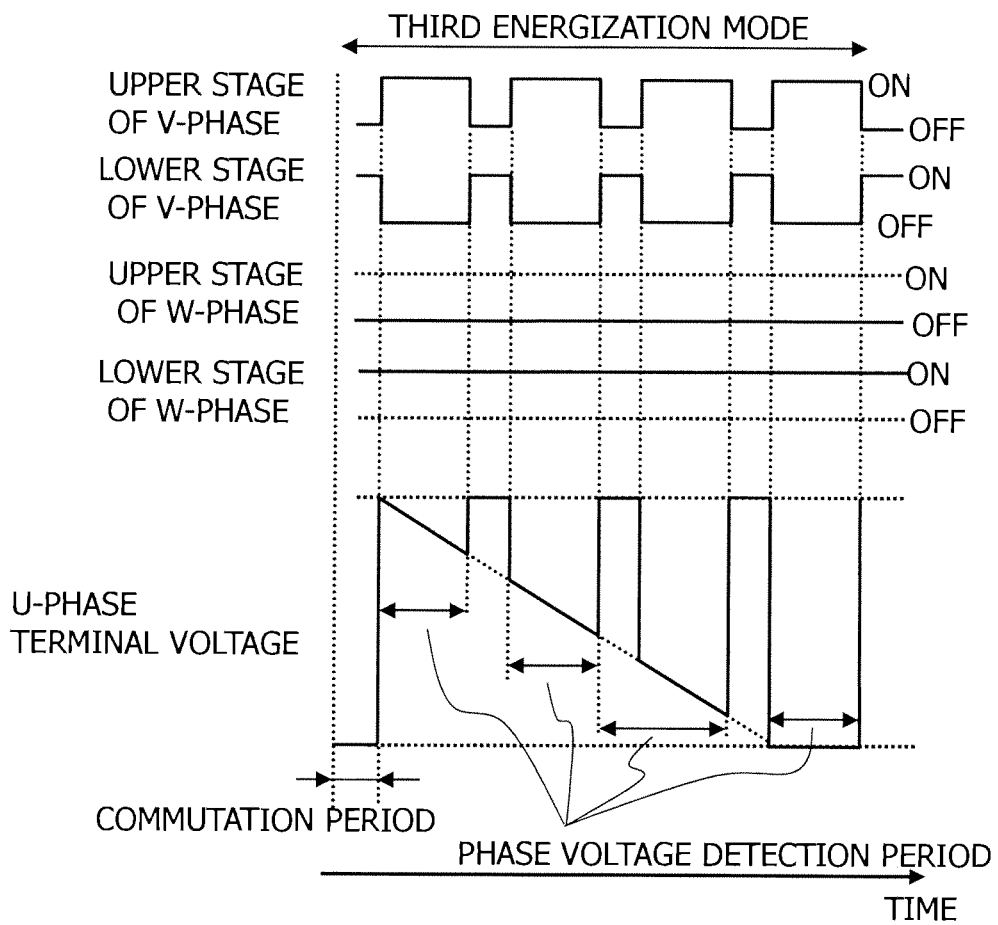
FIG. 8 is a timing chart showing a voltage detection period of a non-energized phase in the embodiment of the present invention.

Here, a detection period of the terminal voltage of a non-energized phase will be explained with reference to FIG. 8, using the third energization mode as an example. In the third energization mode, because voltage V is applied to the V-phase, and voltage −V is applied to the W-phase so that electric current flows from the V-phase to the W-phase, the voltage of the U-phase is to be detected, and the terminal voltage of the U-phase is detected during the ON-period of the switching device 217f in the upper stage of the V-phase.

Moreover, immediately after switching of the energization modes, a commutation current is generated, and when the energization mode switching timing is determined by using the voltage detected in a generation interval of the commutation current, the energization mode switching timing may be erroneously determined.

Therefore, a voltage detection value immediately after switching of the energization modes is not used for determination of the switching timing from the first determination up to a set number of times. The set number of times can be variably set according to the number of motor revolutions and a motor current, and as the number of motor revolutions becomes higher and the motor current becomes higher, a larger value is set for the set number of times.

In Step S356, it is determined whether the motor rotational speed is higher than the set speed. In the sensorless control in which the energization mode is switched based on a signal of a speed electromotive voltage generated in a non-energized phase, in an area where the motor rotational speed is low, the speed electromotive voltage becomes low, thereby making it difficult to detect the switching timing accurately. In a low revolution area of the motor, sensorless control is performed such that the switching timing is determined based on a comparison between the pulse induced voltage and the threshold.

Consequently, in Step S356, it is determined whether it is in a speed range, in which mode switching can be determined by using the speed electromotive voltage as a trigger, based on whether the motor rotational speed is higher than the set speed.

That is, the set speed is a minimum value of the motor rotational speed enabling the switching determination based on the speed electromotive voltage, and is determined beforehand by experiments and simulation and stored.

The motor rotational speed is calculated based on a switching cycle of the energization mode. Moreover, for example, a first set speed for determining transition to the sensorless control by the pulse induced voltage, and a second set speed for determining stop of the sensorless control by the pulse induced voltage (second set speed>(is greater than) first set speed) are set as the set speed, so that a situation in which switching of the sensorless control is performed repetitively in a short time can be suppressed.

In Step S356, when the motor rotational speed is lower than the set speed, control proceeds to Step S357 to compare the voltage of a non-energized phase with the threshold. When the voltage of the non-energized phase crosses the threshold, the energization mode switching timing is determined, and control proceeds to Step S359 to perform switching to the next energization mode.

Specifically, if in the first energization mode at that time, when the voltage of the W-phase, which is a non-energized phase, becomes equal to or lower than a threshold V1-2, switching timing to the second energization mode is determined. If in the second energization mode at that time, when the voltage of the V-phase, which is a non-energized phase, becomes equal to or greater than a threshold V2-3, switching timing to the third energization mode is determined. If in the third energization mode at that time, when the voltage of the U-phase, which is a non-energized phase, becomes equal to or lower than a threshold V3-4, switching timing to the fourth energization mode is determined. If in the fourth energization mode at that time, when the voltage of the W-phase, which is a non-energized phase, becomes equal to or greater than a threshold V4-5, switching timing to the fifth energization mode is determined. If in the fifth energization mode at that time, when the voltage of the V-phase, which is a non-energized phase, becomes equal to or lower than a threshold V5-6, switching timing to the sixth energization mode is determined. If in the six energization mode at that time, when the voltage of the U-phase, which is a non-energized phase, becomes equal to or greater than a threshold V6-1, switching timing to the first energization mode is determined.

On the other hand, in Step S356, when it is determined that the motor rotational speed is greater than the set speed, control proceeds to Step S358, in which the sensorless control by the speed electromotive voltage is performed such that a point in time when it is determined that rotor 216 rotates further by 30 degrees from a point in time when the voltage of a non-energized phase crosses the zero level, is detected as the switching timing to the next energization mode.

Specifically, 30 degrees are converted to time based on the motor rotational speed at that time, the switching timing to the next energization mode is determined at a point in time when time corresponding to 30 degrees has passed from a zero cross point, and control proceeds to Step S359 to perform switching to the next energization mode.

In Step S360, the number of motor revolutions rpm is calculated based on a switching cycle of the energization mode.

Here, a determination method of the lower limit DMIN in Step S353 will be explained in detail.

Figure 9:
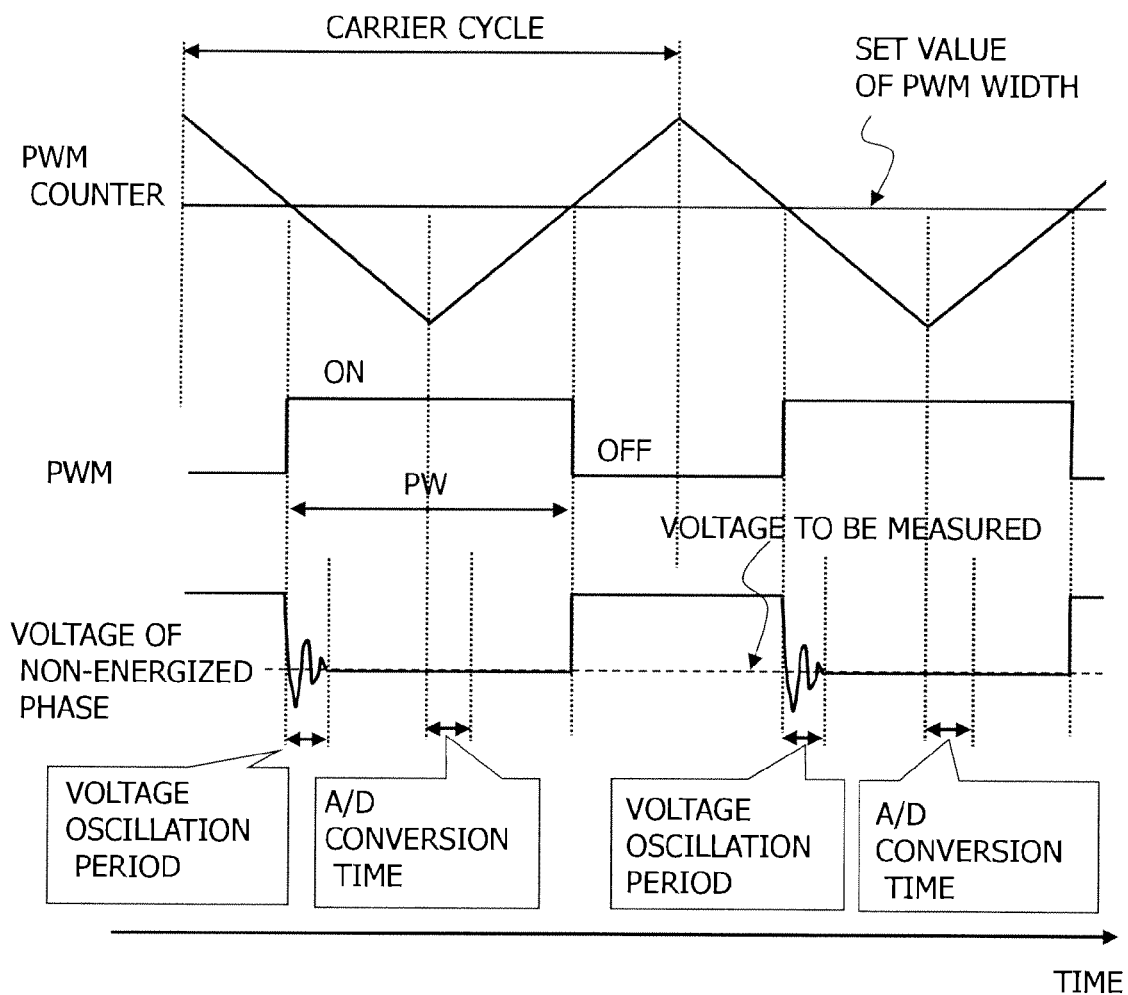
FIG. 9 is a timing chart for explaining a characteristic of a lower limit in the embodiment of the present invention.

For example, as shown in FIG. 9, a point at which a value of a counter repeating increase and decrease for each carrier cycle in the PWM control changes from a decrease to an increase, in other words, the vicinity of the center of a pulse width PW of a pulse applied voltage is designated as sampling timing of the voltage of a non-energized phase. When the sampling timing is determined in this manner, when a period in which the pulse induced voltage of a non-energized phase immediately after application of the pulse voltage oscillates is longer than ½ of the pulse width PW, the pulse induced voltage of the non-energized phase is sampled while the pulse induced voltage is oscillating, and hence, the pulse induced voltage of the non-energized phase is unable to be accurately detected.

Moreover, when the time required for A/D (analog to digital conversion of the pulse induced voltage of a non-energized phase is longer than ½ of the pulse width PW, application of a voltage to the energized phase is stopped during sampling. Also in this case, the pulse induced voltage of the non-energized phase is unable to be accurately detected and brushless motor 2 may lose synchronism.

Therefore, the lower limit MIN (%) is calculated according to the following equation.

DMIN=max(voltage oscillation time, A/D conversion time)×2/carrier cycle×100

According to the above equation (A), one of the voltage oscillation time and the A/D conversion time, whichever the longer, is doubled and designated as the minimum pulse width. Accordingly, a situation in which the pulse induced voltage of a non-energized phase is sampled while the pulse induced voltage is oscillating can be suppressed. Moreover a situation in which application of voltage to an energized phase is stopped during the A/D conversion can be suppressed.

Also, when the point at which the value of the counter repeating increase and decrease for each carrier cycle in the PWM control changes from a decrease to an increase is designated as the sampling timing of the voltage of a non-energized phase, or when PWM switching timing is designated as the sampling timing of the voltage of a non-energized phase, the lower limit DMIN is calculated in the above-described manner.

Moreover, a value acquired beforehand by experiments and simulation can be used for the voltage oscillation time and A/D conversion time, or the voltage oscillation time can be measured in Step S353 and the lower limit DMIN determined based on the measurement result.

Figure 10:
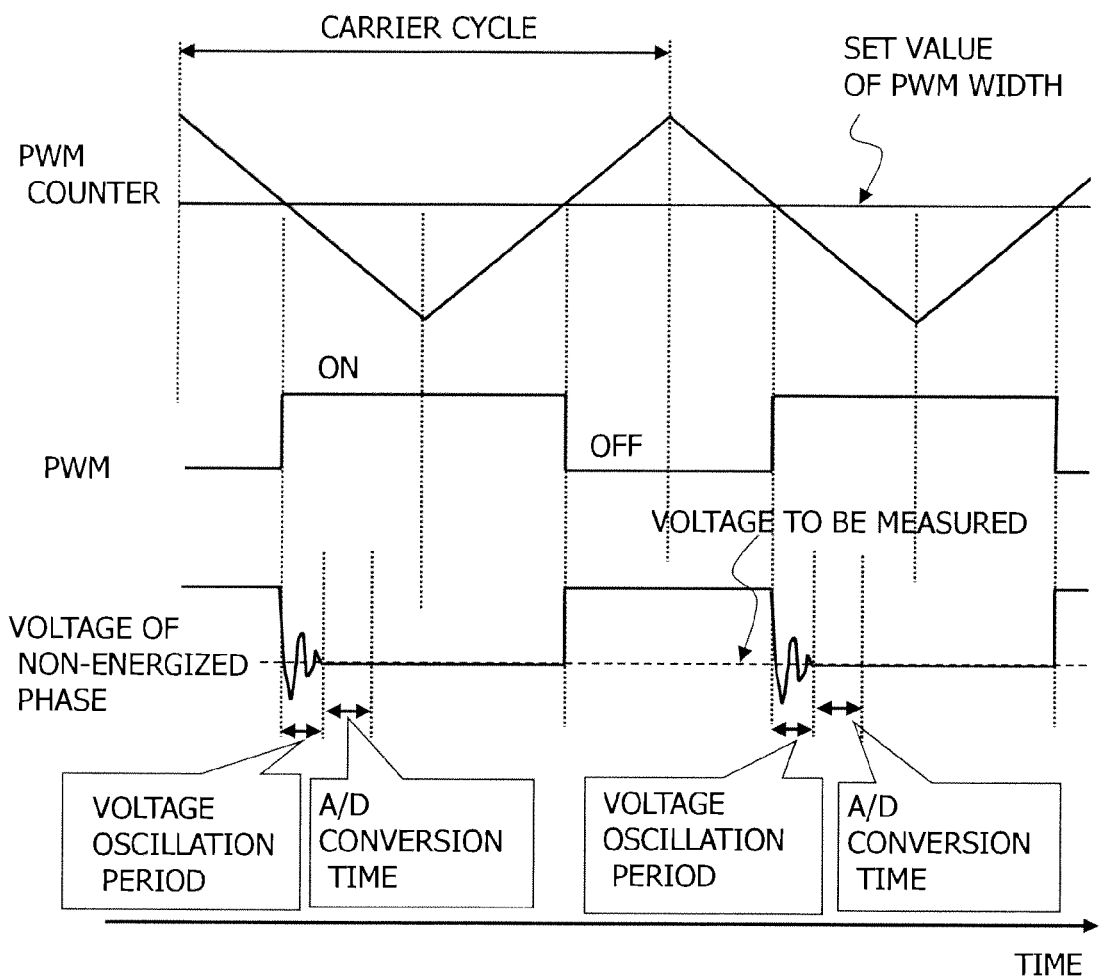
FIG. 10 is a timing chart for explaining the characteristic of the lower limit in the embodiment of the present invention.

Furthermore, when the sampling timing of the voltage of a non-energized phase can be set to arbitrary timing, as shown in FIG. 10, the A/D conversion can be started immediately after the voltage oscillation time has passed. In this case, sampling of the pulse induced voltage of a non-energized phase can be performed within a pulse as short as possible, and a situation in which the pulse induced voltage of a non-energized phase is sampled while the pulse induced voltage is oscillating can be suppressed. Furthermore, a situation in which application of voltage to an energized phase is stopped during the A/D conversion can be suppressed.

Specifically, the lower limit DMIN (%) is calculated according to the following equation.

DMIN=(voltage oscillation time+A/D conversion time)/carrier cycle×100

That is to say, by setting the pulse width PW to be longer than the sum of the voltage oscillation time and the A/D conversion time, and starting A/D conversion immediately after the voltage oscillation time has passed, a situation in which sampling of the pulse induced voltage of a non-energized phase is performed while the pulse induced voltage is oscillating can be suppressed. Moreover a situation in which application of voltage to an energized phase is stopped during the A/D conversion can be suppressed.

Figure 11:
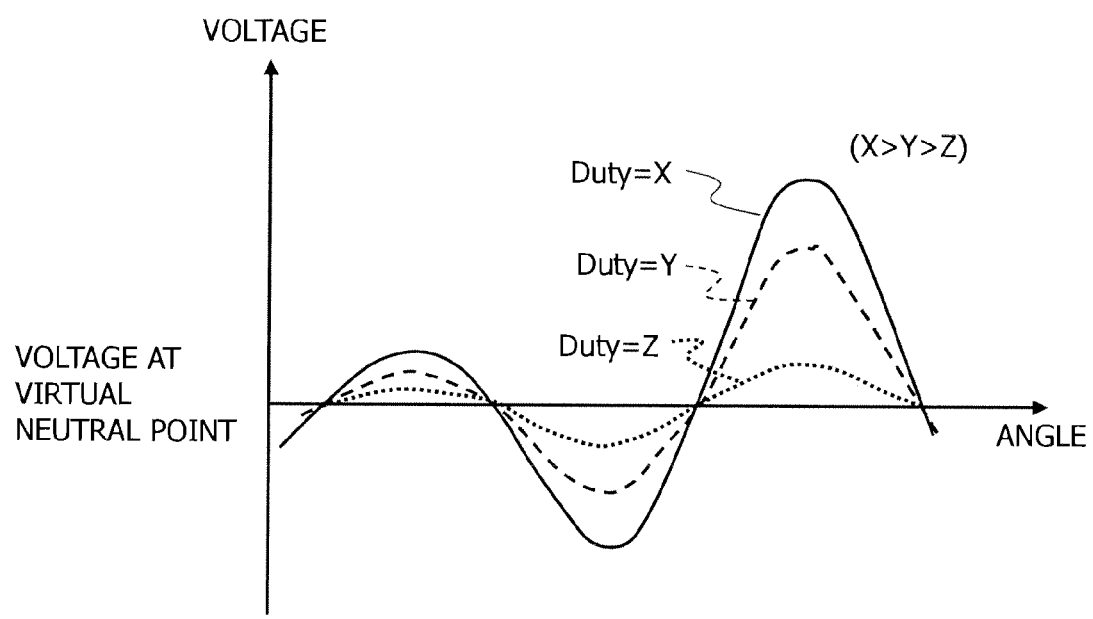
FIG. 11 is a diagram showing a correlation between a pulse induced voltage in a non-energized phase and a duty ratio in the embodiment of the present invention.

Moreover, the magnitude of the pulse induced voltage of a non-energized phase changes according to the duty ratio of the voltage application. As shown in FIG. 11, as the duty ratio becomes smaller, the pulse induced voltage of a non-energized phase becomes smaller. If the duty ratio is small, the pulse induced voltage falls below the voltage detection resolution, and determination of the energization mode switching timing may not be possible.

The minimum value of the duty ratio that generates the pulse induced voltage detectable in a voltage detection circuit can be set as the lower limit DMIN.

Here, a duty ratio of the lower limit DMIN calculated according to the above-described equation or a duty ratio of the lower limit DMIN set based on the voltage detection resolution, whichever the larger, can be set as the final lower limit.

When the lower limit DMIN is set in this manner, a situation in which the pulse induced voltage of a non-energized phase is sampled while the pulse induced voltage is oscillating can be suppressed. Moreover a situation in which application of voltage to an energized phase is stopped during the A/D conversion can be suppressed. Furthermore, the energization mode switching timing can be determined by generating a voltage that can be detected as a pulse induced voltage, and occurrence of loss of synchronism in brushless motor 2 can be suppressed.

As a result, if in the hydraulic system, oil can be stably supplied from electric oil pump 1 during the idle reduction to suppress a decrease in hydraulic pressure efficiently. Moreover, when the water pump is driven by brushless motor 2, the coolant can be stably circulated to suppress overheating of the engine.

In addition to limitation based on the lower limit DMIN of the duty ratio of the voltage application, the carrier cycle can be changed to an increase side in order to increase the time for applying the pulse voltage continuously.

Moreover, when the threshold for determining the energization mode switching timing is to be learnt, learning can be performed in a state with the duty ratio of the voltage application being set as the lower limit DMIN.

As shown in FIG. 11, as the duty ratio becomes smaller, the pulse induced voltage becomes smaller. Therefore, if the threshold is learnt in a state with the duty ratio being larger than the lower limit DMIN, then when the duty ratio becomes smaller than that at the time of learning the threshold, the pulse induced voltage does not cross the threshold, and switching of the energization mode may become impossible.

As a result, the threshold is learnt in a state with the duty ratio being set as the lower limit DMIN, so that even if the duty ratio becomes the lower limit DMIN, the pulse induced voltage reaches the threshold, and the energization mode switching timing can be determined.

Moreover, as described above, when the threshold is learnt in a state with the pulse voltage being applied with the duty ratio set as the lower limit DMIN, the lower limit DMIN can be corrected with respect to the change in motor temperature and motor power-supply voltage.

Figure 12:
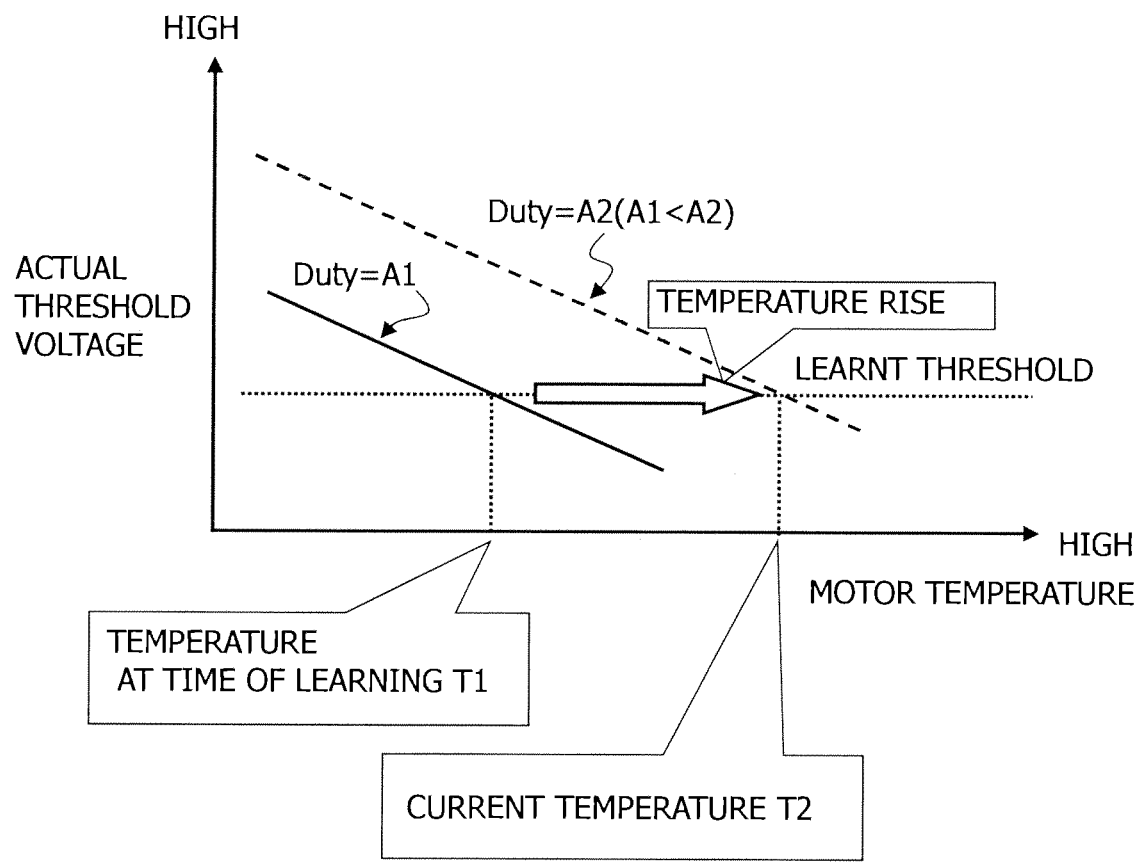
FIG. 12 is a diagram showing a change in the pulse induced voltage due to motor temperature in the embodiment of the present invention.

As shown in FIG. 12, it is assumed that the duty ratio at the time of learning the threshold is A1 and the motor temperature at the time of learning the threshold is T1. When the motor temperature becomes T2 higher than T1, the absolute value of the actual pulse induced voltage at the energization mode switching timing decreases.

That is, when the motor temperature increases in a state with the duty ratio being fixed to the lower limit DMIN, the absolute value of the actual pulse induced voltage at the energization mode switching timing decreases. Consequently, if the threshold learnt at the time of low motor temperature is directly used under a condition that the motor temperature is high, the pulse induced voltage does not reach the threshold, and the energization mode switching timing may not be detected.

Therefore, when the motor temperature becomes T2 higher than motor temperature T1 at the time of learning the threshold, the lower limit DMIN is corrected to increase so as to compensate a level decrease in the pulse induced voltage due to an increase in the motor temperature, thereby increasing the pulse induced voltage when the duty ratio is set as the lower limit DMIN, so that the voltage is held in the vicinity of the pulse induced voltage at the time of learning the threshold.

In other words, the lower limit DMIN is changed in a direction of suppressing a change in the pulse induced voltage due to the motor temperature when the duty ratio is set as the lower limit DMIN.

Specifically, a correction amount of the duty ratio with respect to a temperature increase since the time of learning is stored beforehand, and a correction amount of the duty ratio is determined from a difference between the motor temperature T2 at that time and the motor temperature T1 at the time of learning, to increase the lower limit DMIN by the correction amount. In an example shown in FIG. 12, the duty ratio A1 is corrected to duty ratio A2.

Accordingly, even if the motor temperature increases from the one at the time of learning the threshold, the energization mode switching timing is determined based on a comparison between the pulse induced voltage and the threshold, thereby enabling to perform switching of the energization modes sequentially.

In the case of the hydraulic system, the motor temperature can be represented by oil temperature. The oil temperature can be detected by a sensor or can be estimated from an operation condition of the engine. Moreover, a sensor that detects the motor temperature can be provided.

Furthermore, when a device that detects or estimates the motor temperature is not provided and the motor temperature is unclear, the lower limit DMIN is set high beforehand so that even if the motor temperature becomes the highest temperature, the energization mode switching timing can be determined based on the comparison between the pulse induced voltage and the threshold.

Furthermore, when the motor temperature becomes lower than that at the time of learning, the actual pulse induced voltage at the energization mode switching timing increases. In this case, if the lower limit DMIN is decreased, the pulse induced voltage is held in the vicinity of the pulse induced voltage at the time of learning. However, when the pulse induced voltage increases, the switching determination of the energization mode is performed based on the comparison with the threshold. Therefore the occurrence of a loss of synchronism can be suppressed by increasing the lower limit DMIN at least with respect to an increase in the motor temperature.

When the threshold is learnt by setting the duty ratio of the voltage application as the lower limit DMIN, the threshold can be learnt for each motor temperature. In this case, correction of the lower limit DMIN corresponding to the change in the motor temperature can be omitted.

Figure 13:
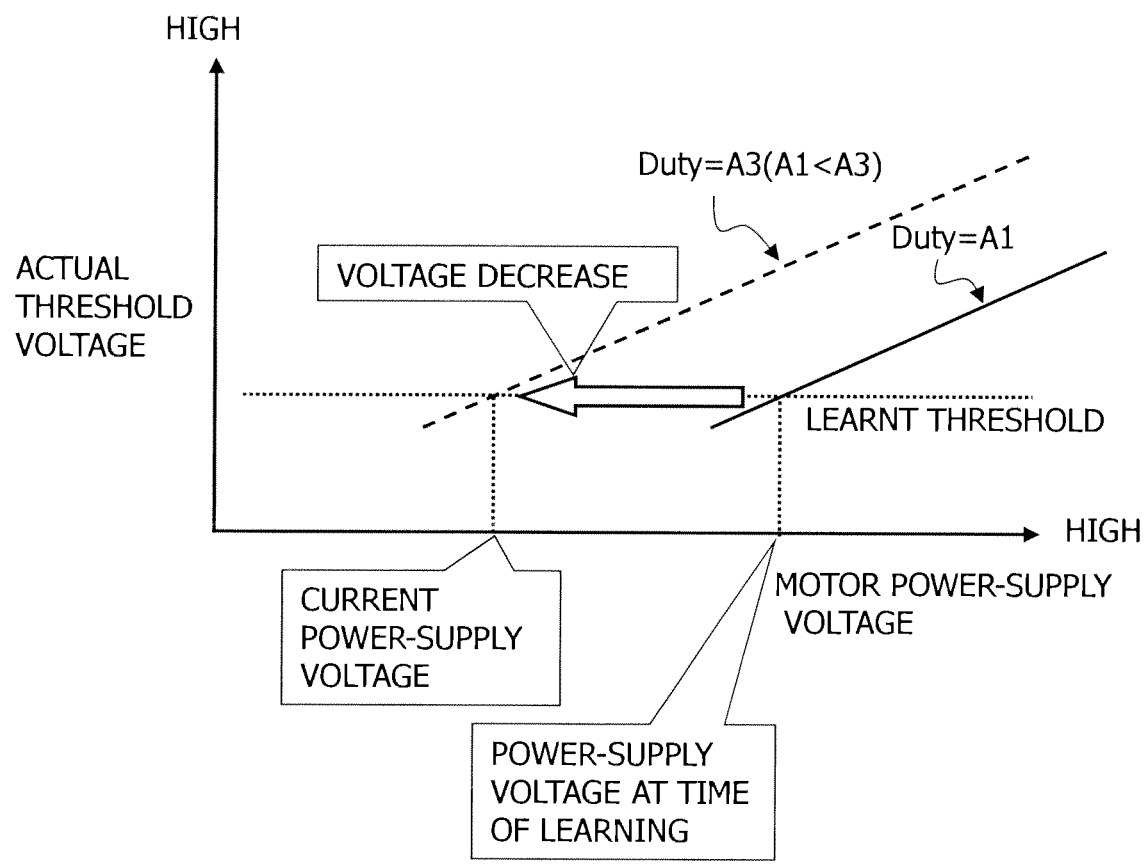
FIG. 13 is a diagram showing a change in the pulse induced voltage due to motor power-supply voltage in the embodiment of the present invention.

On the other hand, the motor power-supply voltage also affects the absolute value of the pulse induced voltage at the energization mode switching timing. As shown in FIG. 13, when the motor power-supply voltage decreases more than that at the time of learning, the absolute value of the pulse induced voltage at the energization mode switching timing decreases, and the pulse induced voltage does not reach the threshold. As a result, the energization mode switching timing may not be determined.

Therefore, when the motor power-supply voltage becomes lower than that at the time of learning, the lower limit DMIN is increased so as to compensate a level decrease of the pulse induced voltage due to a decrease in the power-supply voltage, and the pulse induced voltage is increased when a motor applied duty is set to the lower limit DMIN, thereby holding the pulse induced voltage in the vicinity of the pulse induced voltage at the time of learning. In other words, the lower limit DMIN is changed in a direction of suppressing a change in the pulse induced voltage due to the power-supply voltage when the duty ratio is set to the lower limit DMIN.

Specifically, a correction amount of the duty ratio with respect to a decrease in the power-supply voltage since the time of learning is determined and stored beforehand, and a correction amount of the duty ratio is determined based on a difference between the power-supply voltage at that time and the power-supply voltage at the time of learning, and the lower limit DMIN is corrected by the correction amount. In an example shown in FIG. 13, the duty ratio A1 is corrected to a duty ratio A3.

Accordingly, even if the power-supply voltage decreases from the one at the time of learning the threshold, the energization mode switching timing is determined based on the comparison between the pulse induced voltage and the threshold, thereby enabling to perform switching of the energization modes sequentially.

Moreover, when the motor power-supply voltage increases more than that at the time of learning the threshold, the pulse induced voltage at the energization mode switching timing increases. In this case, if the lower limit DMIN is decreased, the pulse induced voltage is held in the vicinity of that at the time of learning. However, when the pulse induced voltage increases, the switching determination of the energization mode can be performed based on the comparison with the threshold. Therefore, the occurrence of a loss of synchronism can be suppressed by increasing the lower limit DMIN at least with respect to a decrease in the power-supply voltage.

When the threshold is learnt by setting the duty ratio as the lower limit DMIN, the threshold can be learnt for each power-supply voltage. In this case, correction of the lower limit DMIN corresponding to the change in the power-supply voltage can be omitted.

When both correction based on the motor temperature and correction based on the power-supply voltage are performed with respect to the lower limit DMIN, even if there is a change in the motor temperature and in the power-supply voltage, the energization mode switching timing can be determined based on the comparison between the pulse induced voltage and the threshold, thereby enabling to perform switching of the energization modes sequentially.

Figure 14:
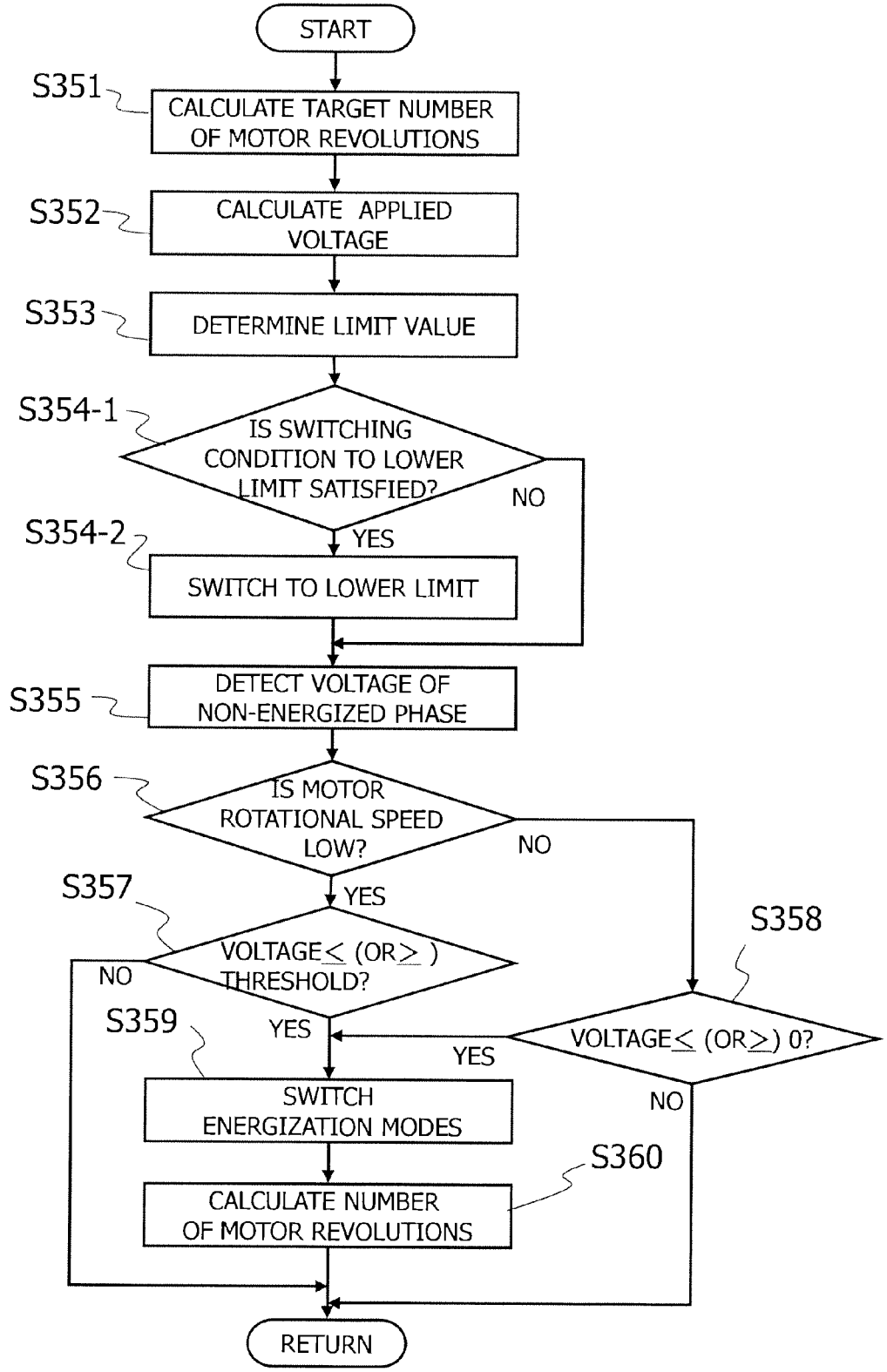
FIG. 14 is a flowchart showing drive control of the brushless motor in the embodiment of the present invention.

As shown in Step S354-1 and in Step S354-2 in the flowchart shown in FIG. 14, the duty ratio can be switched to the lower limit DMIN based on the motor operation condition.

Figure 6:
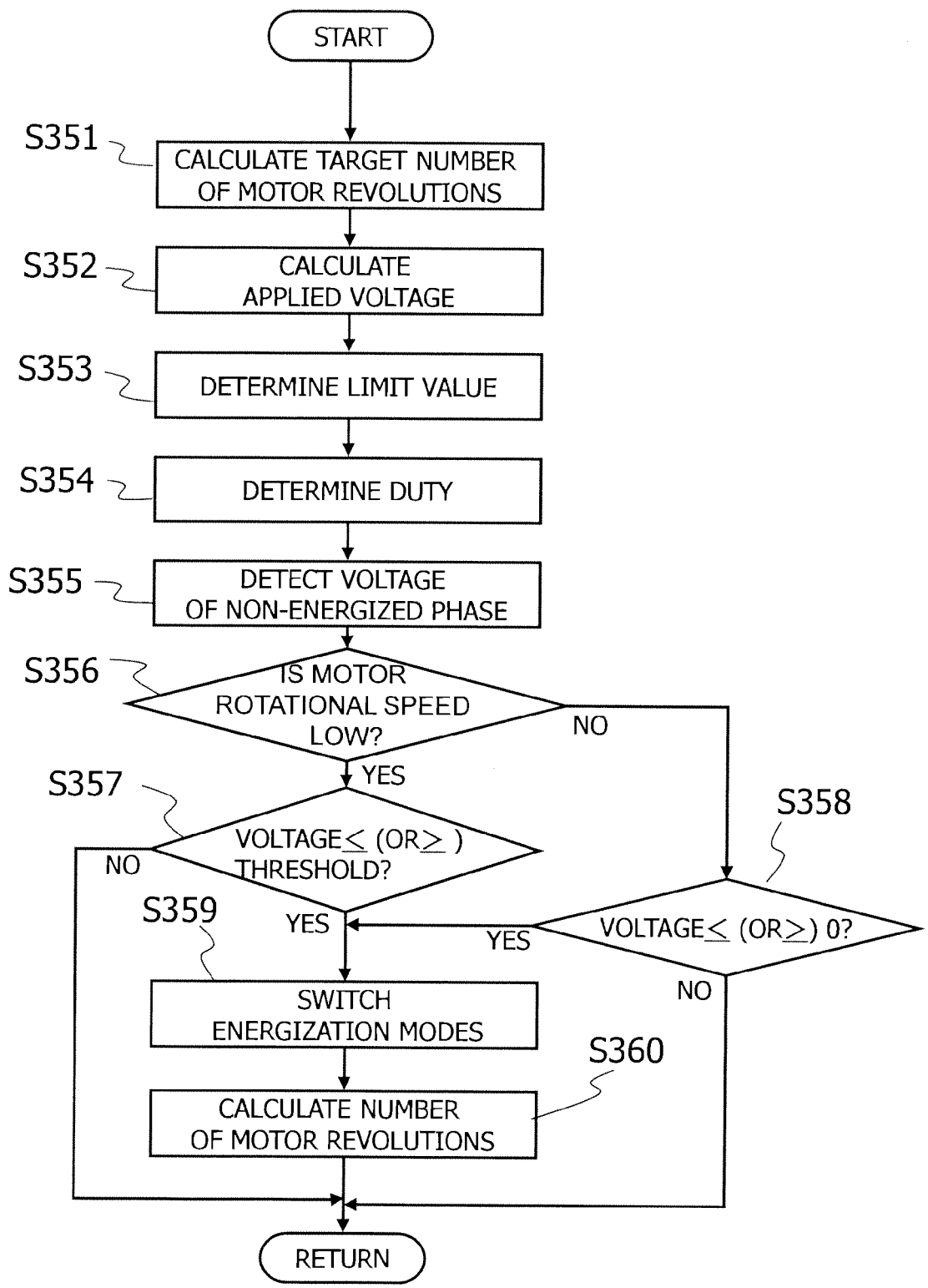
FIG. 6 is a flowchart showing details of the drive control of the brushless motor in the embodiment of the present invention.

In the respective steps in the flowchart shown in FIG. 14, excluding Step S354-1 and Step S354-2, the process explained in the flowchart in FIG. 6 is performed in the same manner. Therefore, explanation of the processing content in the respective steps other than Step S354-1 and in Step S354-2 is omitted.

In Step S354-1, it is determined whether the duty ratio needs to be switched to the lower limit DMIN.

Specifically, when a load of brushless motor 2 is small, the duty ratio is switched to the lower limit DMIN. An operation condition in which the load of brushless motor 2 is small is for example, one when the target number of revolutions (rpm) of brushless motor 2 is lower than a specified number of revolutions and the motor current is lower than a specified current.

Consequently, if the target number of revolutions (rpm) of brushless motor 2 is lower than the specified number of revolutions and the motor current is lower than the specified current, it is determined that the duty ratio needs to be switched to the lower limit DMIN, and control proceeds to Step S354-2.

In Step S354-2, the duty ratio is switched to the lower limit DMIN, instead of the duty ratio based on the applied voltage determined based on a deviation between the target rotational speed and the actual rotational speed.

That is to say, in the operation condition in which the load of brushless motor 2 is small, the actual number of revolutions can be approximated to the target number of revolutions (rpm) with a low duty ratio falling below the lower limit DMIN. If brushless motor 2 is controlled with the duty ratio as it is, the pulse induced voltage is sampled in an oscillating period of the pulse induced voltage, thereby causing erroneous detection of the pulse induced voltage or causing the pulse induced voltage to fall below the voltage detection resolution. As a result, determination of the energization mode switching timing may not be possible.

Therefore, in a low load area in which the duty ratio required for approximating the actual number of revolutions to the target number of revolutions (rpm) falls below the lower limit DMIN, the duty ratio is switched to the lower limit DMIN beforehand. As a result, a situation such as in which the pulse induced voltage is sampled in an oscillating period of the pulse induced voltage, to cause erroneous detection of the pulse induced voltage, or cause the pulse induced voltage to fall below the voltage detection resolution, so that determination of the energization mode switching timing becomes impossible, is suppressed.

Consequently, the specified number of revolutions and the specified current for determining whether the duty ratio is in the low load area in which the duty ratio is set to the lower limit DMIN, are adapted beforehand so as to be able to determine an operation area in which the duty ratio required for approximating the actual number of revolutions to the target number of revolutions (rpm) falls below the lower limit DMIN.

Figure 15:
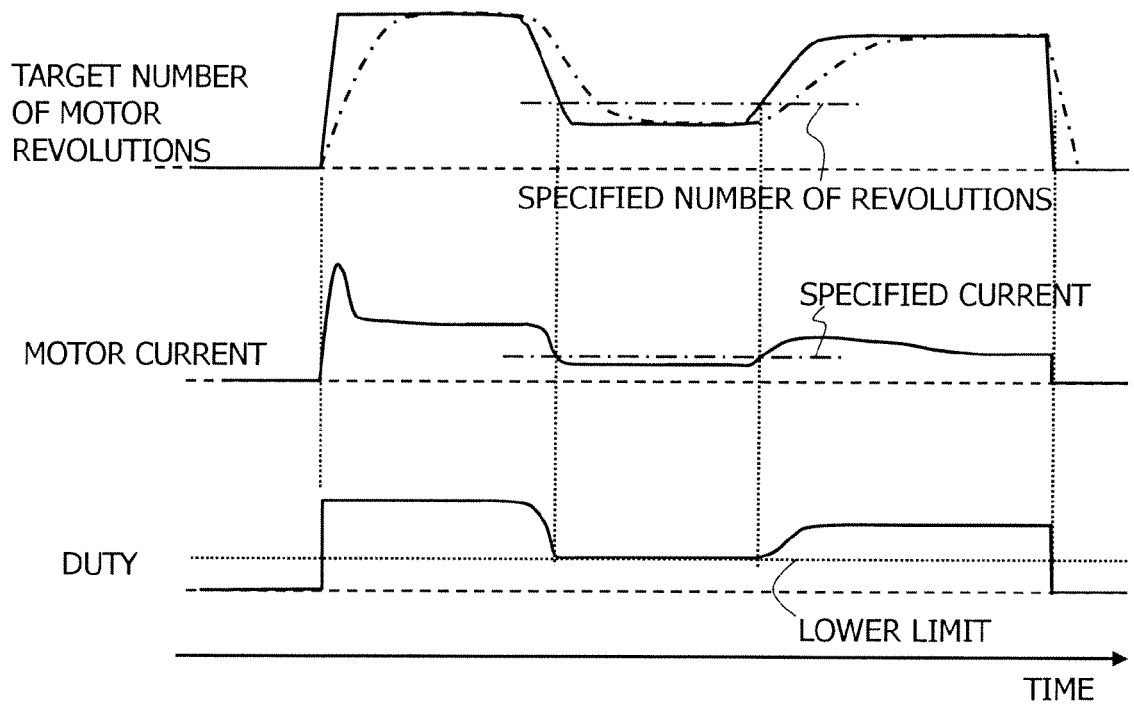
FIG. 15 is a timing chart showing a correlation among a target number of motor revolutions, motor current, and a duty ratio in the embodiment of the present invention.

FIG. 15 is a timing chart showing an example of a change in target motor rotational speed, motor current, and motor applied duty when the process shown in the flowchart in FIG. 14 is performed.

As shown in FIG. 15, if the conditions of the target number of motor revolutions being lower than the specified number of revolutions and the motor current being lower than the specified current are satisfied, the duty ratio is uniformly switched to the lower limit DMIN, and if the conditions of the target number of motor revolutions being lower than the specified number of revolutions and the motor current being lower than the specified current are not satisfied, the duty ratio required for approximating the actual number of revolutions to the target number of revolutions (rpm) is used.

Moreover, in the case of brushless motor 2 that drives an in-car oil pump 1, brushless motor 2 may be used in a temperature range of from an extremely low temperature to a high temperature such as 100° C. Therefore there is a large change in a pump load due to a change in viscosity of the oil.

Here, if in order to ensure responsiveness of a pump discharge amount at an extremely low temperature, a gain in the PWM control of brushless motor 2 is increased, then when an instruction to largely decrease the discharge amount at a high temperature is issued, excessive correction is performed. As a result, brushless motor 2 may be shut down.

However, if the duty ratio at the time of performing the PWM control of brushless motor 2 is limited to equal to or larger than the lower limit DMIN, then even if an instruction to largely decrease the discharge amount at a high temperature is provided, the duty ratio does not decrease to be lower than the lower limit DMIN, and hence, shutdown of brushless motor 2 can be avoided. As a result a decrease in the hydraulic pressure can be suppressed.

Moreover, in order to suppress a situation in which the pulse induced voltage is erroneously detected and determination of the energization mode switching timing becomes impossible, the application time of the pulse voltage needs only to be increased. As a method of increasing the application time of the pulse voltage, the pulse shift process described below can be performed.

The pulse shift process is a process for increasing the continuous voltage application time without changing the duty ratio which is the sum of the voltage application time in one cycle. If the duty ratio is limited by the lower limit DMIN after performing the pulse shift process, the lower limit DMIN can be suppressed to be low, and a wide variable range of the duty ratio can be ensured.

Figure 16:
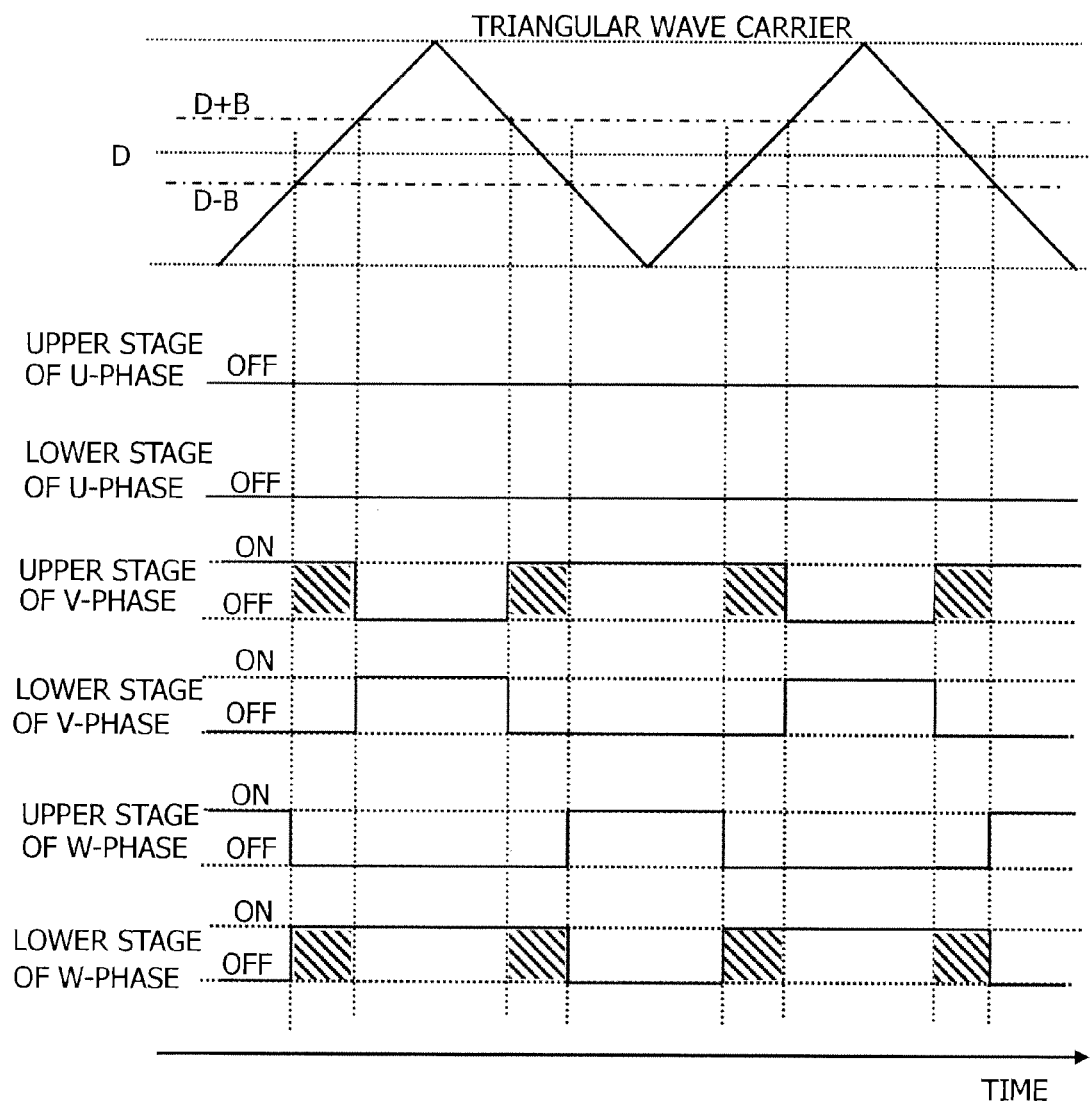
FIG. 16 is a timing chart for explaining a generation process of a PWM signal in the embodiment of the present invention.

FIG. 16 shows general PWM generation.

In FIG. 16, a value of an intermediate value D of a triangular wave carrier is voltage=0, and a voltage command value is designated as B. PWM of the V-phase uses a result of a comparison between the triangular wave carrier and a voltage command value D+B, and PWM of the W-phase uses a result of a comparison between the triangular wave carrier and a voltage command value D−B.

That is to say, the switching device in the upper stage of the V-phase is turned on in a period in which the voltage command value D+B is higher than the triangular wave carrier, and the switching device in the lower stage of the W-phase is turned on in a period in which the triangular wave carrier is higher than the voltage command value D−B.

However, in the PWM generation shown in FIG. 16, if the duty is small, the application time of the pulse voltage, during which both the V-phase and the W-phase are energized, becomes short, and it is difficult to detect the voltage induced in a non-energized phase accurately.

Figure 17:
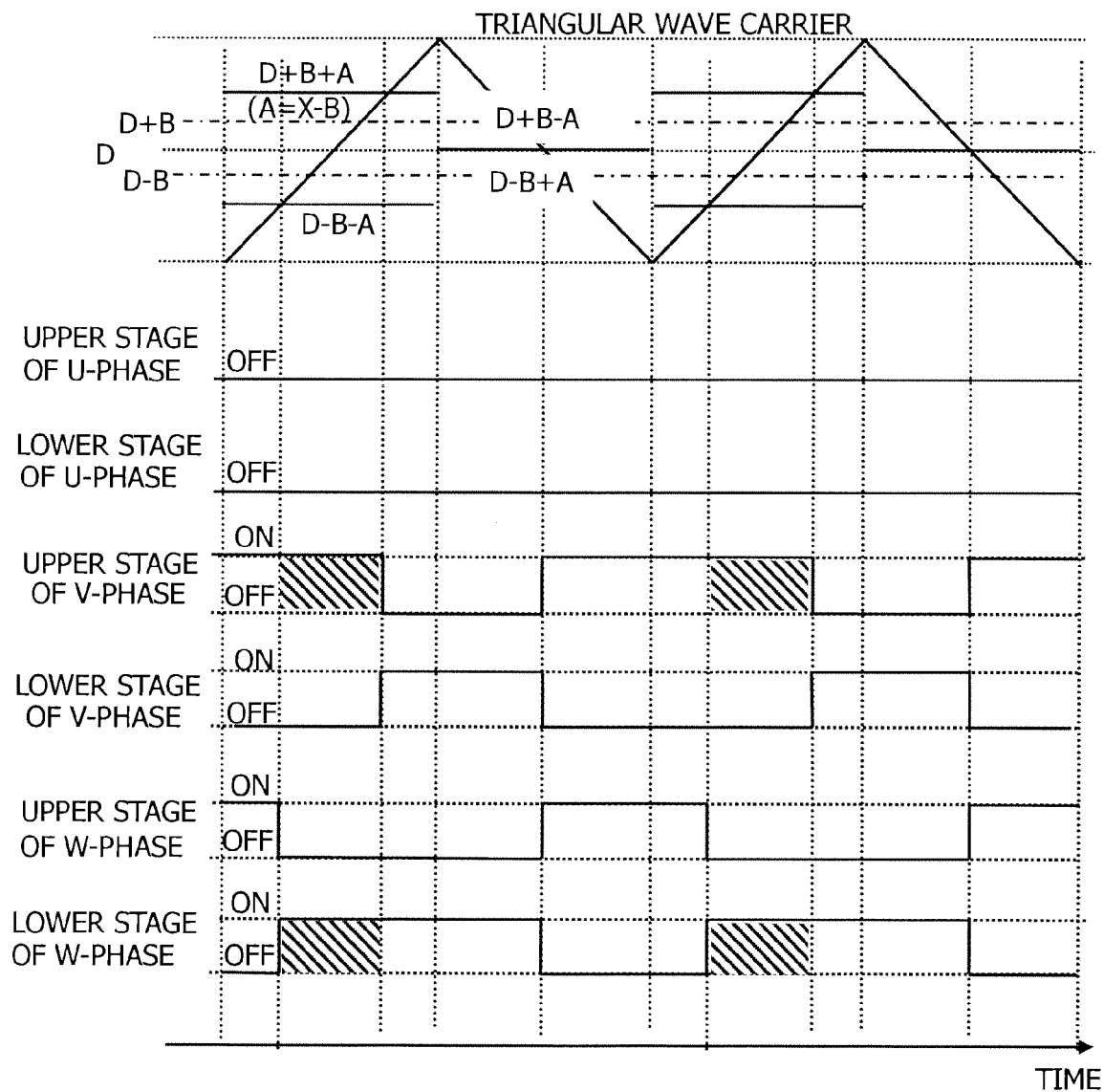
FIG. 17 is a timing chart for explaining the generation process of the PWM signal in the embodiment of the present invention.

Therefore, by performing the pulse shift process shown in FIG. 17, the continuous time during which two phases are energized with the same duty as that of the PWM generation shown in FIG. 16 is increased, thereby enabling to enhance the detection accuracy of the voltage induced in a non-energized phase.

In the pulse shift process shown in FIG. 17, the voltage command value is corrected at the peak and valley timing of the triangular wave carrier.

Specifically, in an ascending period of the triangular wave carrier, the voltage command value D+B is corrected to D+B+A and the voltage command value D−B is corrected to D−B−A, so that the voltage command value is away from voltage=D by X. In a descending period of the triangular wave carrier, the voltage command value D+B is corrected to D+B−A and the voltage command value D−B is corrected to D−B+A, so that the voltage command value is approximated to voltage=D. It is assumed here that A=X−B.

By correcting the voltage command value, the time during which both the V-phase and the W-phase are energized in an ascending period of the triangular wave carrier increases by a decrease in the time during which both the V-phase and the W-phase are energized in a descending period of the triangular wave carrier, thereby enabling to increase the continuous time during which both the two phases are energized, without changing the duty ratio. As a result, a situation in which the pulse induced voltage is sampled in the oscillating period of the pulse induced voltage or the voltage application is lost during the A/D conversion can be suppressed.

The entire contents of Japanese Patent Application No. 2011-122490, filed May 31, 2011 are incorporated herein by reference.

While only a select embodiment have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention, the invention as claimed in the appended claims and their equivalents.

What is claimed is:

1. A brushless motor drive device comprising:
   a switching section that includes a plurality of energization modes in which two phases to be applied with a pulse voltage are selected from three phases of a three-phase brushless motor, and is configured to switch the plurality of energization modes;
   a determining section configured to determine switching timing of the energization modes based on a pulse induced voltage induced in a non-energized phase of the three phases by the pulse voltage; and
   a restricting section configured to
      set a duty ratio of the pulse voltage to be equal to or greater than a lower limit, and
      set a duty ratio, with which the pulse voltage is applied, for a time longer than a sum of an oscillation time of the pulse induced voltage immediately after starting application of the pulse voltage and a time required for A/D converting of the pulse induced voltage, as the lower limit.

2. The brushless motor drive device according to claim 1, wherein the restricting section is configured to set the lower limit as a duty ratio in an operation condition in which a load of the three-phase brushless motor is smaller than a set value.

3. The brushless motor drive device according to claim 1, wherein the determining section is configured to compare the pulse induced voltage with a threshold for switching of the plurality of the energization modes, and the brushless motor drive device further comprises:
   a learning section configured to learn the threshold in the determining section in a state with the duty ratio of the pulse voltage being set as the lower limit.

4. A brushless motor drive device comprising:
   a switching section that includes a plurality of energization modes in which two phases to be applied with a pulse voltage are selected from three phases of a three-phase brushless motor, and which is configured to switch the plurality of energization modes;
   a determining section configured to determine switching timing of the plurality of energization modes based on a pulse induced voltage induced in a non-energized phase of the three phases by the pulse voltage; and
   a restricting section configured to
      set a duty ratio of the pulse voltage to equal to or greater than a lower limit, and
      set a duty ratio, with which the pulse voltage is applied, for a time longer than twice an oscillation time of the pulse induced voltage immediately after starting application of the pulse voltage, or a time required for A/D converting of the pulse induced voltage, whichever is longer, as the lower limit.

5. The brushless motor drive device according to claim 4, wherein the restricting section is configured to set the lower limit as a duty ratio in an operation condition in which a load of the three-phase brushless motor is smaller than a set value.

6. The brushless motor drive device according to claim 4, wherein the determining section is configured to compare the pulse induced voltage with a threshold for switching of the plurality of the energization modes, and the brushless motor drive device further comprises:
   a learning section configured to learn the threshold in the determining section in a state with the duty ratio of the pulse voltage being set as the lower limit.

7. A brushless motor drive method, comprising:
   determining switching timing of a plurality of energization modes based on a pulse induced voltage induced in a non-energized phase of three phases of a three-phase brushless motor;
   switching the plurality of energization modes in which two phases to be applied with a pulse voltage are selected from the three phases of the three-phase brushless motor, at the switching timing of the plurality of energization modes;
   setting a duty ratio, with which the pulse voltage is applied, for a time longer than a sum of an oscillation time of the pulse induced voltage immediately after starting application of the pulse voltage and a time required for A/D converting of the pulse induced voltage, as a lower limit;
   setting a duty ratio of the pulse voltage to be equal to or greater than the lower limit; and
   applying the pulse voltage to two phases corresponding to the energization modes.

8. The brushless motor drive method according to claim 7, wherein
    setting the duty ratio to be equal to or greater than the lower limit comprises setting the lower limit to a duty ratio in an operation condition in which a load of the three-phase brushless motor is smaller than a set value.

9. The brushless motor drive method according to claim 7, further comprising:
    at determination of the switching timing of the energization modes, comparing the pulse induced voltage with a threshold to determine the switching timing of the energization modes, and
    learning the threshold in a state with the duty ratio of the pulse voltage being set as the lower limit.

10. A brushless motor drive method, comprising:
    determining switching timing of a plurality of energization modes based on a pulse induced voltage induced in a non-energized phase of three phases of a three-phase brushless motor;
    switching the plurality of energization modes in which two phases to be applied with a pulse voltage are selected from the three phases of the three-phase brushless motor, at the switching timing of the plurality of energization modes;
    setting a duty ratio, with which the pulse voltage is applied, for a time longer than twice an oscillation time of the pulse induced voltage immediately after starting application of the pulse voltage, or a time required for A/D converting of the pulse induced voltage, whichever is longer, as a lower limit;
    setting a duty ratio of the pulse voltage to equal to or greater than a lower limit; and
    applying the pulse voltage to two phases corresponding to the energization modes.

11. The brushless motor drive method according to claim 10, wherein setting the duty ratio to be equal to or greater than the lower limit comprises:
    setting the lower limit to a duty ratio in an operation condition in which a load of the three-phase brushless motor is smaller than a set value.

12. The brushless motor drive method according to claim 10, further comprising
    at determination of the switching timing of the energization modes, comparing the pulse induced voltage with a threshold to determine the switching timing of the energization modes, and
    learning the threshold in a state with the duty ratio of the pulse voltage being set as the lower limit.

* * * * *